United States Patent Office.

ADOLPH OTT, OF NEW YORK, N. Y.

Letters Patent No. 107,711, dated September 27, 1870.

IMPROVEMENT IN TREATING TIN SCRAP FOR THE MANUFACTURE OF STANNATE OF POTASH, &c.

*The Schedule referred to in these Letters Patent and making part of the same.*

I, ADOLPH OTT, of New York, county and State of New York, have invented a certain Process for the production of Stannate of Soda or Stannate of Potash from Tinned Sheet-Iron, or the so-called Tin Scraps, and for the production of Wrought-Iron or Steel from the remaining iron scraps, of which the following is a specification.

In order to prepare the stannate of soda or potassa, I put the tinned sheet-iron into a suitable vessel, which may be either an iron kettle, such as used in chemical establishments, or into a wooden tub, provided with pipes for the introduction of steam. Or, if it is desired that the tin scraps should be kept in agitation with the several ingredients, which I shall mention presently, I put them into a wooden barrel, fitted up in such a manner that it can be kept rotating. This barrel can be of the same construction as those used for the amalgamation of silver ores, but must be set horizontally. It should also be provided with a pipe for the introduction of steam.

The vessel being charged with the scraps, I introduce the following chemicals into the same, namely: for fifty pounds of scraps, eight quarts of a lie of caustic soda, indicating 18 or 20° of Baumé's hydrometer; ten pounds of litharge or red lead; one pound and a half of nitrate of soda, and one pound and a half of manganate of soda.

If I wish to produce the stannate of potash, instead of the respective soda compound, I take fourteen pounds of a lie of caustic potash, two pounds of nitrate of potash, and two pounds of manganate of potash, in lieu of the soda compounds hereinbefore specified.

These chemicals being introduced into the vessel with the tin scraps, I turn on steam and keep the whole boiling until the tin has been entirely separated from the iron, which will have taken place in the course of a few hours.

In this process metallic lead and peroxide of manganese separate, the former as a spongy mass, while the oxygen held originally by these bodies, inasmuch as it may be disengaged under the circumstances, is employed in the conversion of the tin into an oxide of tin or stannic acid, which, in uniting with the respective alkalies, forms a stannate of alkali.

In order to decolorize the liquid obtained, I filter the same through linen bags containing bone-black, and evaporate it hereupon in an evaporating-pan until indicating the specific gravity of 18° Baumé.

When showing this specific weight, the fire is withdrawn and the liquid allowed to cool; it will then yield the stannate in a crystalized state.

The stannate of soda will be combined with three equivalents of water. After being separated from the mother liquid it is dried and packed.

I intend to use the stannates as mordants for woolen, cotton, or linen, for which purpose they are in so far preferable to the ordinary mordants, as brighter colors are produced by them.

In this process, the red lead, as well as the manganese, may be regained in the following manner:

They are separated from the tin, with which they will remain in the boiling vessel, by turning on a stream of water; hereafter they are transferred upon filters, and when nearly dry they are mixed with one half of their weight of caustic soda or two-thirds of caustic potash.

This mixture is exposed to the atmospheric air on a red-hot iron plate. Thus red lead and manganate of soda or potash are again formed, which will be again suitable to separate tin from scraps.

In regard to the resulting sheet-iron, I form packets and melt them in a proper furnace by the introduction of generation gases and hot blast, together with a few per cent. of peroxide of manganese or another proper oxygen-yielding substance, which will decarbonize it, and produce a tenacious, fine-grained iron. The same is then worked in the same manner as blooms from which wrought-iron is to be produced.

Claim.

I claim as my invention—

The process for the preparation of compounds, denominated stannate of soda, stannate of potash, and the production of wrought-iron and steel from tinned sheet-iron, substantially as described.

ADOLPH OTT.

Witnesses:
 THO. F. WELLS,
 CHAS. SELVAGE.